(12) United States Patent
Xu et al.

(10) Patent No.: US 8,742,000 B2
(45) Date of Patent: Jun. 3, 2014

(54) PREPARATION METHOD OF HOT DIP GALVANIZED SHEET ANTI-CORROSIVE TREATMENT AGENT OF ENVIRONMENTAL PROTECTIVE

(75) Inventors: Zhefeng Xu, Sichuan (CN); Dongsheng Mei, Sichuan (CN); Taixiong Guo, Sichuan (CN); Quan Xu, Sichuan (CN); Yong Chen, Sichuan (CN); Xingde Cheng, Sichuan (CN); Guoan Li, Sichuan (CN); Aiping Zhang, Sichuan (CN)

(73) Assignees: Pangang Group Steel Vanadium and Titanium Co., Ltd., Sichuan (CN); Pangang Group Panzhihua Iron and Steel Research Institute Co., Ltd., Sichuan (CN); Pangang Group Company Ltd., Sichuan (CN); Pangang Group Research Institute Co., Ltd., Sichuan (CN)

( * ) Notice: Subject to any disclaimer, the term of this patent is extended or adjusted under 35 U.S.C. 154(b) by 61 days.

(21) Appl. No.: 13/002,302

(22) PCT Filed: Nov. 26, 2009

(86) PCT No.: PCT/CN2009/075155
§ 371 (c)(1),
(2), (4) Date: Jun. 24, 2011

(87) PCT Pub. No.: WO2010/133068
PCT Pub. Date: Nov. 25, 2010

(65) Prior Publication Data
US 2012/0052312 A1    Mar. 1, 2012

(30) Foreign Application Priority Data

May 18, 2009    (CN) .......................... 2009 1 0202921

(51) Int. Cl.
*C08K 3/36* (2006.01)
*B32B 15/04* (2006.01)
*C09D 5/08* (2006.01)

(52) U.S. Cl.
USPC ........... 524/493; 524/556; 524/588; 524/591; 977/773

(58) Field of Classification Search
USPC .................. 524/493, 556, 588, 591; 977/773
See application file for complete search history.

(56) References Cited

U.S. PATENT DOCUMENTS

| 4,889,775 | A | * | 12/1989 | Adaniya et al. ............... 428/623 |
| 5,064,468 | A | * | 11/1991 | Okai et al. .................. 106/14.12 |
| 5,500,463 | A | * | 3/1996 | Nishimura et al. ............ 523/408 |
| 5,731,372 | A | * | 3/1998 | Shimakura et al. ........... 524/417 |
| 6,475,300 | B2 | * | 11/2002 | Shimakura et al. ........... 148/247 |
| 8,262,809 | B2 | * | 9/2012 | Inbe et al. ..................... 148/247 |
| 2007/0134498 | A1 | * | 6/2007 | Umeyama et al. ............ 428/413 |

FOREIGN PATENT DOCUMENTS

| CN | 1201056 A | 12/1998 |
| CN | 1268583 A | 10/2000 |
| CN | 1381532 A | 11/2002 |
| CN | 101126157 | 2/2008 |
| CN | 101307451 A | 11/2008 |
| CN | 101343506 A | 1/2009 |
| JP | 2004197165 A | 7/2004 |
| WO | WO 2006/068438 A1 | 6/2006 |

OTHER PUBLICATIONS http://www.nissanchem-usa.com/snowtex.php, 2007.*
PCT Notification of Transmittal of the International Search Report and the Written Opinion of the International Searching Authority, or the Declaration for PCT Counterpart Application No. PCT/CN2009/075155, 15 pgs., (Mar. 11, 2010).

* cited by examiner

*Primary Examiner* — Satya Sastri
(74) *Attorney, Agent, or Firm* — Blakely, Sokoloff, Taylor & Zafman LLP

(57) ABSTRACT

A coating composition is provided, the starting materials of which comprise nano $SiO_2$, film-forming substance, film-forming aid, accelerator, acid, and water. The composition has pH of 3-9. A passivated zinc-plated material is also provided. The zinc-plated material comprises zinc-plated substrate and passivated coat adhered to the surface of the zinc-plated substrate, wherein the passivated coat is formed by curing the coating composition. The coating composition can impart to the zinc-plated material excellent corrosion resistance, water resistance, high temperature resistance, surface conductivity, and adhesion to the zinc-plated substrate. Additionally, the coating composition contains no $Cr^{6+}$, and satisfies the requirement of EU RoHS Directive.

15 Claims, No Drawings

US 8,742,000 B2

PREPARATION METHOD OF HOT DIP GALVANIZED SHEET ANTI-CORROSIVE TREATMENT AGENT OF ENVIRONMENTAL PROTECTIVE

CROSS-REFERENCE TO RELATED APPLICATIONS

This patent application is a U.S. National Phase application under 35 U.S.C. §371 of International Application No. PCT/CN2009/075155, filed on Nov. 26, 2009, entitled A COATING COMPOSITION AND PASSIVATED ZINC-PLATED MATERIAL, which claims priority to Chinese Patent. Application No. 200910202921.5, filed on May. 18, 2009.

FIELD OF THE INVENTION

The present invention relates to a coating composition, and further relates to a passivated zinc-plated material, and the passivated zinc-plated material comprises passivation coat layer formed by curing the coating composition according to the present invention.

BACKGROUND OF THE INVENTION

Zinc-plated material, such as zinc-plated steel sheet or coil, is vulnerable to corrosion caused by corrosion medium in ambient environment during production, storage, transportation, and application process. For preventing the corrosion of the zinc-plated material, the treating agent containing $Cr^{6+}$ like chromate is widely adopted to form a chromate passivation film on the zinc-plated steel sheet, and then an anticorrosive coat is formed by heat curing.

But EU RoHs Directive coming into effect on 1 Jul. 2006 bans product with hazard substance (such as Pb, $Cr^{6+}$, Hg, Cd, polybrominated biphenyl (PBB), and polybrominated diphenyl ethers (PBDE)) content beyond standard. To satisfy the requirement, global steel enterprises have adopted surface thin coat treatment technique for the zinc-plated steel sheet, such as non-hazardous passivation treatment. The available non-hazardous passivation treatment liquid comprises Nihon Parkerizing LSI-C-2011 and Henkel 6000.

CN 1268583A disclosed a Cr-free passivation solution for protection of zinc-plating layer and coating method thereof, the method for preparing the passivation solution comprises (1) mixing water soluble acrylate resin and water at volume ratio of 1:1-4 for dilution; (2) adding 1-5 g of molybdate per liter of the diluted water-soluble acrylate resin solution to give colorless transparent passivation solution with pH of 6-9. The passivation solution is uniformly coated on the zinc-plated part surface.

The aforementioned method can improve the corrosion resistance of the zinc-plated part to some extent; but the treated zinc plated steel sheet still has the disadvantage of poor water resistance, and generates white powder on its surface in high-temperature and high humidity environment, or blushing and chalking occur 24 hr after 100° C. hot water is dripped on the zinc-plated steel sheet at room temperature.

Therefore, the passivation coat formed by the available Cr-free passivation solution for the zinc-plated material has the shortcomings of poor water resistance and poor high temperature resistance.

SUMMARY OF THE INVENTION

The object of the present invention is to overcome the disadvantage of the passivation coat formed by available passivation solution on the surface of the zinc-plated material, including poor water resistance and poor high temperature resistance, to provide a coating composition capable of forming passivation coat with good water resistance and good high temperature resistance on zinc-plated material, and further to provide a passivated zinc-plated material.

The present invention provides a coating composition, wherein the starting materials of the coating composition comprise nano $SiO_2$, film-forming substance, film-forming aid, accelerator, acid, and water, and the coating composition has pH of 3-9.

The present invention further provides a passivated zinc-plated material, which includes zinc-plated substrate and passivation coat adhered on the surface of the zinc-plated substrate, wherein the passivation coat is the product formed by curing the coating composition according to the present invention.

The coating composition according to the present invention can provide good passivation effect for the zinc-plated sheet, so as to achieve good corrosion resistance; at the same time, the passivation coat formed by the coating composition coated and cured on the zinc-plated material is excellent in water resistance, high temperature resistance, and surface conductivity, so as to significantly improve corrosion resistance, water resistance, and high temperature resistance of the zinc-plated material, impart the zinc-plated material with good surface conductivity, and achieve good adhesion between the formed passivation coat and the zinc-plated material. Additionally, the coating composition according to the present invention contains no $Cr^{6+}$, and satisfies the requirement of EU RoHS Directive.

DETAILED DESCRIPTION OF THE PREFERRED EMBODIMENTS

The starting materials of the coating composition according to the present invention comprise nano $SiO_2$, film-forming substance, film-forming aid, accelerator, acid, and water, and the coating composition has pH of 3-9.

According to the coating composition in the present invention, relative to 1 liter of the coating composition, the amount of the nano $SiO_2$ is 30-120 g, preferably 50-100 g, the amount of the film-forming substance is 50-120 g, preferably 80-100 g, the amount of the film-forming aid is 10-50 g, preferably 20-40 g, the amount of the accelerator is 5-30 g, preferably 10-20 g, and the amount of the acid is 20-100 g, preferably 25-40 g.

The coating composition according to the present invention has pH of 3-9, preferably 3.5-8.5; within this pH range, the film-forming reaction can been effectively carried out between the coating composition and zinc-plating layer of zinc-plated material to make the formed passivation film layer closely bond with the zinc-plating layer.

According to the coating composition in the present invention, the smaller the silica particle size, the better the compactness and self sealing performance of the passivation layer formed by the coating composition of the present invention coated on the zinc-plated sheet; therefore, the average particle size of the silica is preferably 50 nm or less, more preferably 20 nm or less.

According to the coating composition in the present invention, the film-forming substance can have functions of sealing and auxiliary film forming to make the formed passivation coat more durable and provide excellent adhesion for the coat formed by the coating composition on the zinc-plated sheet. The film-forming substance can be various film-forming substances usually used by those skilled in the art, such as one or more selected from (meth)acrylic acid resin, epoxy resin, styrene-acrylate emulsion, silicone-acrylate emulsion, and polyurethane resin, each with weight average molecular weight of 8,000-200,000, wherein the preferred weight average molecular weight of (meth)acrylic acid resin is 8,000-10,000, the preferred weight average molecular weight of epoxy resin is 20,000-30,000, the preferred weight average molecular weight of styrene-acrylate emulsion is 150,000-200,000, the preferred weight average molecular weight of silicone-acrylate emulsion is 100,000-150,000, and the preferred weight average molecular weight of polyurethane resin is 10,000-50,000.

According to the coating composition in the present invention, the film-forming aid can impart the zinc-plated material with better water resistance and weather resistance, and improve the adhesion between the passivation coat and the zinc-plated material. The film-forming aid can be one or more selected from silane coupling agent, triethylamine and tetraethyl orthosilicate. Triethylamine can cure the coated film layer, silane coupling agent and tetraethyl orthosilicate can form the film layer and prevent the corrosion of substrate. The silane coupling agent can be various available silane coupling agents, such as methyltriethoxysilane, vinyl silane (such as vinyltriethoxysilane, vinyltrimethoxysilane or vinyltri(2-methoxyethoxy)silane), aminosilane (such as aminopropyl triethoxysilane, diethylaminomethyl triethoxysilane or anilinomethyl triethoxysilane), methacryloxy silane (such as methacryloxy propyl trimethoxy silane), epoxy silane (such as epoxycyclohexylethyltrimethoxysilane or glycidoxypropyltrimethoxy silane), and mercaptosilane (such as mercaptopropyltrimethoxy silane).

According to the coating composition in the present invention, the accelerator can promote film formation, and lower curing temperature. The accelerator can be selected from various substances capable of providing the functions, such as one or more selected from sodium silicate, sodium fluoride, sodium pyrophosphate, sodium phosphate, acetone, glycol, ethanol, and triethyl phosphate.

According to the coating composition in the present invention, the acid can be phosphoric acid and/or phytic acid. Because of the chelating reaction between the phytic acid and metal to form dense film, the phytic acid is preferred. When the film-forming substance adopts styrene-acrylate emulsion and/or silicone-acrylate emulsion, preferably acid is omitted as they have high viscosity.

According to the coating composition in the present invention, preferably, besides the above components, the coating composition may further comprise other additive components, such as one or more selected from high temperature resistant additive, water resistant additive, dye, pigment, dispersing agent, and defoaming agent. Based on the total weight of the composition, the content of the other components is not more than 20 wt %, preferably not more than 10 wt %. The high temperature resistant additive can be polyurethane acrylate. The polyurethane acrylate can be various available polyurethane acrylates, preferably with weight average molecular weight of 700-1,500, more preferably 800-1,200. The polyurethane acrylate satisfying the aforementioned molecular weight range can be purchased commercially.

The defoaming agent can be various defoaming agents well known in the art, such as one or more selected from polyether-based defoaming agent, higher alcohols, silicone-based defoaming agent, and polyether-modified silicone. Preferably, the content of the defoaming agent is 0.01-0.05 wt % based on the total weight of the composition.

The coating composition in the present invention can be prepared by various methods, for example, by uniformly mixing the nano $SiO_2$, film-forming substance, film-forming aid, accelerator, acid, and water according to aforementioned content range. Preferably, the coating composition is prepared according to any one of the following methods: (1) uniformly mixing nano $SiO_2$ and water, sequentially adding accelerator, film-forming aid, acid, and film-forming substance while mixing well, wherein in this preparation method, nano $SiO_2$ can be uniformly mixed with total amount of water, or mixed with partial amount of water, and finally the water in balance is supplemented; (2) sequentially mixing the mixture of film-forming aid and water with the mixture of film-forming substance, accelerator, and acid, and the mixture of nano $SiO_2$ and water; wherein in this preparation method, the film-forming aid can be mixed with partial amount of water, then nano $SiO_2$ is mixed with the rest water, or the film-forming aid is mixed with partial amount of water, the nanos $SiO_2$ is mixed with another part of water, and finally the water in balance is supplemented; (3) sequentially mixing the mixture of accelerator and acid with the mixture of film-forming substance, film-forming aid, and water, and the mixture of nano $SiO_2$ and water; wherein in this preparation method, the film-forming aid can be mixed with partial amount of water, then nano $SiO_2$ is mixed with the rest water, or the film-forming aid is mixed with partial amount of water, nano $SiO_2$ is mixed with another part of water, and finally the water in balance in supplemented. Preferably, stirring is adopted to make mixing more uniform.

There is no special requirement for addition sequence of the other additive components, and the addition can be carried out at any aforementioned step.

According to the coating composition in the present invention, preferably, the coating composition has high solid content, such as 15-20 wt %, so that adhesion amount of the coating composition during coating process can be saved to lower cost. The solid content in the present invention refers to the definition well known in the art, which is also called non-volatile content, and means weight percentage of residual matter left after sample dried with respect to the total weight of the sample.

The passivated zinc-plated material according to the present application includes zinc-plated substrate and passivation coat adhered on the surface of the zinc-plated substrate, wherein the passivation coat is the product formed by the cured coating composition in the present invention.

According to the passivated zinc-plated material in the present invention, the zinc-plated substrate can be various material with the surface plated with zinc, such as zinc-plated steel material produced by electroplating, hot dip galvanizing, thermal spray coating, and mechanical coating.

The inventive coating composition can be adhered on the zinc-plated substrate by various known methods. For the consideration of easy operation and loss minimization during attachment process, the coating method is preferred to obtain the passivated zinc-plated material in the present invention. The coating method can be various known coating methods, such as continuous coating or intermittent coating, preferably continuous roller coating.

According to the passivated zinc-plated material in the present invention, preferably, the passivation coat has adhesion amount of 500-1,500 $mg/m^2$, preferably 500-1,000 $mg/m^2$, on the surface of the zinc-plated substrate; with such adhesion amount, the thickness of coat formed on the zinc-plated substrate is usually 0.5-1.0 micron. The adhesion amount of the passivation coat within that range can make the zinc-plated substrate be fully protected from corrosion, and also can prevent the passivation coat from cracking during the curing of the coating composition, as the crack may make the passivation coat lose anticorrosion function.

According to the passivated zinc-plated material in the present invention, after the coating composition is coated on the surface of the zinc-plated substrate, passivation coat can be obtained by removing water from the coating composition; therefore the curing method can be natural air drying, hot air drying or heating. For increasing curing speed, the curing temperature is preferably 60-120° C., more preferably 65-110° C., the curing time is usually not more than 2 s, such as 0.5-2 s, preferably within 1 s; therefore coating and curing can be carried out on the production line of the zinc-plated substrate to save floor area.

The present invention will be further described in details through the following Examples.

EXAMPLE 1

(1) Preparation of the Coating Composition

The coating composition is prepared by mixing 100 g of nano $SiO_2$ (average particle size 20 nm) with 100 mL of distilled water, and stirring well; slowly adding 20 g of sodium pyrophosphate as accelerator, and stirring well; adding 20 g of silane coupling agent (methyltriethoxysilane), and stirring well; adding 50 mL of 50 wt % phytic acid solution, and stirring well; adding 80 g of acrylic acid resin (weight average molecular weight 10,000) as film-forming substance, and stirring to make the solution homogeneous and stable; and finally adding distilled water to make the volume of the resulting mixture be 1 L.

The obtained coating composition has pH of 4, and solid content of 15 wt %.

(2) Preparation of the Passivated Zinc-Plated Material

The obtained coating composition is roller coated on the surface of hot dip galvanized steel strip (DX52D+Z), and cured at 65° C. for 2 s; the adhesion amount of the passivation coat formed on the hot dip galvanized steel strip is 1,000 mg/m$^2$.

EXAMPLE 2

(1) Preparation of the Coating Composition

The coating composition is prepared by mixing 50 g of nano $SiO_2$ (average particle size 20 nm) with 100 mL of distilled water in first container, and stirring well; mixing 10 g of sodium fluoride as accelerator with 55 mL of 50 wt % phytic acid solution in second container, and stirring well; completely dissolving 40 g of triethylamine as film-forming aid in 200 mL of distilled water in third container, adding 100 g of epoxy resin (weight average molecular weight 20,000) as film forming substance, and stirring well; adding the mixture in the third container into the mixture in the second container, stirring well, then adding the resultant mixture into the mixture in the first container, and stirring well to give homogeneous and stable mixture; and finally adding distilled water to make the volume of the resulting mixture be 1 L.

The obtained coating composition has pH of 3.5, and solid content of 20 wt %.

(2) Preparation of the Passivated Zinc-Plated Material

The obtained coating composition is roller coated on the surface of hot dip galvanized steel strip (DX52D+Z), and cured at 120° C. for 0.5 s; the adhesion amount of the passivation coat formed on the hot dip galvanized steel strip is 1,500 mg/m$^2$.

EXAMPLE 3

(1) Preparation of the Coating Composition

The coating composition is prepared by mixing 80 g of nano $SiO_2$ (average particle size 30 nm) with 100 mL of distilled water in first container, and stirring well; adding 30 g of silane coupling agent (aminopropyltriethoxysilane KH-550) as film forming aid into second container, then adding 15 g of ethylene glycol as accelerator, and making them completely dissolved in 200 mL of distilled water; adding 55 mL of 50 wt % styrene-acrylate emulsion (weight average molecular weight 150,000) in third container, and stirring well, then adding 90 g of polyurethane resin (weight average molecular weight 150,000) as film-forming substance, and stirring well; adding the mixture in the third container into the mixture in the second container, and stirring well, then adding the resultant mixture into the mixture in the first container, and stirring well to give homogeneous and stable mixture; and finally adding distilled water to make the volume of the resulting mixture be 1 L.

The obtained coating composition has pH of 7.5, and solid content of 15 wt %.

(2) Preparation of the Passivated Zinc-Plated Material

The obtained coating composition is roller coated on the surface of hot dip galvanized steel strip (DX52D+Z), and cured at 100° C. for 1 s; the adhesion amount of the hot dip passivation coat formed on the galvanized steel strip is 500 mg/m$^2$.

EXAMPLE 4

The coating composition and the passivated zinc-plated material are prepared according to the same method as Example 1, except that the sodium pyrophosphate as the accelerator in the coating composition is replaced by triethyl phosphate to obtain the coating composition and the passivated zinc-plated material.

EXAMPLE 5

The coating composition and the passivated zinc-plated material are prepared according to the same method as Example 1, except that the sodium pyrophosphate as the accelerator in the coating composition is replaced by sodium phosphate to obtain the coating composition and the passivated zinc-plated material.

EXAMPLE 6

The coating composition and the passivated zinc-plated material are prepared according to the same method as Example 3, except that the ethylene glycol as the accelerator in the coating composition is replaced by acetone, and the silane coupling agent is replaced by tetraethyl orthosilicate to obtain the coating composition and the passivated zinc-plated material.

COMPARISON EXAMPLE 1

According to the method disclosed in CN 1268583A, 50 mL of water soluble acrylate resin (produced by Guangzhou Jianhong Chemical Factory, WS-1A), 50 g of water, and 0.1 g of sodium molybdate are formulated into passivation liquid with pH of 8.0.

The passivation liquid is roller coated on the surface of hot dip galvanized steel strip (DX52D+Z), and cured at 65° C. for 2 s; the adhesion amount of the passivation coat formed on the hot dip galvanized steel strip is 1,000 mg/m².

COMPARISON EXAMPLE 2

Commercial available Nihon Parkerizing LSI-C-2011 Cr-free passivation liquid is roller coated on the surface of hot dip galvanized steel strip (DX52D+Z), and cured at 65° C. for 2 s; the adhesion amount of the passivation coat formed on the hot dip galvanized steel strip is 1,000 mg/m².

COMPARISON EXAMPLE 3

Commercial available Henkel 6000 Cr-free passivation liquid is roller coated on the surface of hot dip galvanized steel strip (DX52D+Z), and cured at 65° C. for 2 s; the adhesion amount of the passivation coat formed on the hot dip galvanized steel strip is 1,000 mg/m².

Performance Test (1) Water Resistance Test

One or more drops of water at 100° C. is dripped on the passivation coat; after the water drops are naturally dried in air, it is observed whether the passivation coat surface is damaged or dissolved due to soaking of the water film, and whether white mark appears on the surface.

(2) Corrosion Resistance Test

Corrosion test is performed according to the method and conditions specified in Chinese National Standard No. GB/T 10125-1997 ("Corrosion tests in artificial atmospheres-Salt spray tests"), and then the percentage of corrosion area with respect to the total area is measured after corrosion carried out for 72 hr and 96 hr respectively according to Chinese National Standard No. GB 142335-90 ("Metallic coatings-Coatings anodic to the substrate-Rating of test specimens subjected to corrosion"). If the corrosion area of 72 hr corrosion result is less than 5%, and the corrosion area of 96 hr corrosion result is less than 15%, the corrosion resistance is good; otherwise, the corrosion resistance is poor.

(3) Adhesion Test

One hundred of 1 mm×1 mm checkers are scribed on the sample by scriber, transparent adhesive tape (producted by US 3M Corporation, model 600) is flatly adhered to the checkers without any void, then the adhesive tape is vertically peeled off as fast as possible, and it is observed weather coat peels off at the scribing edge. If the coat peel-off amount is between 0-5%, the result is 5B; if the coat peel-off amount is between 5-10%, the result is 4B; if the coat peel-off amount is between 10-20%, the result is 3B; if the coat peel-off amount is between 20-30%, the result is 2B; if the coat peel-off amount is between 30-50%, the result is B; and if the coat peel-off amount is above 50%, the result is 0B.

(4) High Temperature Resistance Test

The sample is baked at 300° C. for 20 min, and BYK D60° differential colorimeter is adopted to measure a0, b0, and L0 values of the sample surface before baking, and a1, b1, and L1 values of the sample surface after baking, then the color difference is calculated according to the following equation:

$$\Delta E = [(\Delta a)^2 + (\Delta b)^2 + (\Delta L)^2]^{\frac{1}{2}}$$

wherein,
$\Delta a$ is the value of the difference between a0 and a1;
$\Delta b$ is the value of the difference between b0 and b1;
$\Delta L$ is the value of the difference between L0 and L1.

If the color difference $\Delta E<5$, the sample surface generates no yellowing, which means the sample has good high temperature resistance; if the color difference $\Delta E>5$, the sample surface generates yellowing, which means the sample has poor high temperature resistance.

(5) Surface Conductivity

SX-1934 digital four-probe tester is adopted to measure the surface resistance of sample.

The passivated zinc-plated materials obtained in the Examples 1-6 and Comparison Examples 1-3 are tested according to the above methods, and the results are shown in Table 1.

TABLE 1

| Examples | Water resistance | Corrosion area (%) 72 hr | Corrosion area (%) 96 hr | Adhesion | Color difference before and after baking ΔE | Surface resistance (mΩ · cm⁻¹) |
| --- | --- | --- | --- | --- | --- | --- |
| Example 1 | No blushing on film layer | 3 | 12 | 5B | 2 | 0.09 |
| Example 2 | No blushing on film layer | 4 | 12 | 5B | 3 | 0.12 |
| Example 3 | No blushing on film layer | 3 | 11 | 5B | 4 | 0.10 |
| Example 4 | No blushing on film layer | 2 | 10 | 5B | 4 | 0.11 |
| Example 5 | No blushing on film layer | 3 | 14 | 5B | 3 | 0.11 |
| Example 6 | No blushing on film layer | 2 | 10 | 5B | 3 | 0.10 |
| Comparative Example 1 | Slight blushing on film layer | 5 | 15 | 4B | 8 | 0.08 |
| Comparative Example 2 | Slight blushing on film layer | 3 | 14 | 5B | 6 | 0.13 |
| Comparative Example 3 | Slight blushing on film layer | 5 | 19 | 4B | 6 | 0.19 |

It can be seen from the Table 1, that the passivated zinc-plated material, obtained by coating the zinc-plated substrate with the inventive coating composition, is excellent in water resistance, corrosion resistance, high temperature resistance, surface conductivity, and the adhesion between the passivation coat and the zinc-plated substrate, and is particularly more superior than the prior art in aspects of water resistance and high temperature resistance.

What is claimed is:

1. A coating composition, characterized in that the starting materials of the
coating composition consists of nano $SiO_2$, film-forming substance, film-forming aid,
accelerator, acid, and water, and the coating composition has pH of 3-9,
the film-forming substance is one or more selected from (meth)acrylic acid resin, epoxy resin, styrene-acrylate emulsion, silicone-acrylate emulsion, and polyurethane resin, each with weight average molecular weight of 8,000-200,000;

the film-forming aid is one or more selected from silane coupling agent, triethylamine and tetraethyl orthosilicate;

the accelerator is one or more selected from sodium silicate, sodium fluoride, sodium pyrophosphate, sodium phosphate, acetone, ethylene glycol, ethanol, and triethyl phosphate; and the acid is phosphoric acid and/or phytic acid.

2. The coating composition according to claim 1, wherein relative to 1 liter of the coating composition, the amount of the nano $SiO_2$ is 30-120 g, the amount of the film-forming substance is 50-120 g, the amount of the film-forming aid is 10-50 g, the amount of the accelerator is 5-30 g, and the amount of the acid is 20-100 g; and the coating composition has pH of 3.5-8.5.

3. The coating composition according to claim 2, wherein relative to 1 liter of the coating composition, the amount of the nano $SiO_2$ is 50-100 g, the amount of the film-forming substance is 80-100 g, the amount of the film-forming aid is 20-40 g, the amount of the accelerator is 10-20 g, and the amount of the acid is 25-40 g.

4. The coating composition according to claim 1, wherein the nano $SiO_2$ has average particle size of 50 nm or less.

5. The coating composition according to claim 1, wherein the coating composition is prepared by mixing nano $SiO_2$ with water, and sequentially adding accelerator, film-forming aid, acid, and film-forming substance while mixing well.

6. The coating composition according to claim 1, wherein the coating composition is prepared by sequentially mixing the mixture of film-forming aid and water with the mixture of film-forming substance, accelerator, and acid, and the mixture of nano $SiO_2$ and water.

7. The coating composition according to claim 1, wherein the coating composition is prepared by sequentially mixing the mixture of accelerator and acid with the mixture of film-forming substance, film-forming aid, and water, and the mixture of nano $SiO_2$ and water.

8. The coating composition according to claim 2, wherein the nano $SiO_2$ has average particle size of 50 nm or less.

9. The coating composition according to claim 2, wherein the coating composition is prepared by mixing nano $SiO_2$ with water, and sequentially adding accelerator, film-forming aid, acid, and film-forming substance while mixing well.

10. The coating composition according to claim 2, wherein the coating composition is prepared by sequentially mixing the mixture of film-forming aid and water with the mixture of film-forming substance, accelerator, and acid, and the mixture of nano $SiO_2$ and water.

11. The coating composition according to claim 2, wherein the coating composition is prepared by sequentially mixing the mixture of accelerator and acid with the mixture of film-forming substance, film-forming aid, and water, and the mixture of nano $SiO_2$ and water.

12. The coating composition according to claim 3, wherein the nano $SiO_2$ has average particle size of 50 nm or less.

13. The coating composition according to claim 3, wherein the coating composition is prepared by mixing nano $SiO_2$ with water, and sequentially adding accelerator, film-forming aid, acid, and film-forming substance while mixing well.

14. The coating composition according to claim 3, wherein the coating composition is prepared by sequentially mixing the mixture of film-forming aid and water with the mixture of film-forming substance, accelerator, and acid, and the mixture of nano $SiO_2$ and water.

15. The coating composition according to claim 3, wherein the coating composition is prepared by sequentially mixing the mixture of accelerator and acid with the mixture of film-forming substance, film-forming aid, and water, and the mixture of nano $SiO_2$ and water.

* * * * *